US006238727B1

(12) United States Patent
Takemoto et al.

(10) Patent No.: US 6,238,727 B1
(45) Date of Patent: *May 29, 2001

(54) RUMINANT FEED ADDITIVE COMPOSITION AND PROCESS FOR PRODUCING THE SAME

(75) Inventors: Tadashi Takemoto; Nobuyoshi Kitamura; Toshihisa Kato; Masahiko Oshimura; Ken-ichi Mori, all of Kawasaki (JP)

(73) Assignee: Ajinomoto, Co., Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 38 days.

(21) Appl. No.: 09/261,226

(22) Filed: Mar. 3, 1999

(30) Foreign Application Priority Data

Mar. 4, 1998 (JP) .................................................. 10-051968
Jun. 4, 1998 (JP) .................................................. 10-155605
Aug. 19, 1998 (JP) ................................................ 10-233075

(51) Int. Cl.[7] ........................................................ A23J 1/00
(52) U.S. Cl. ............................................ 426/656; 426/807
(58) Field of Search ....................................... 426/656, 807

(56) References Cited

U.S. PATENT DOCUMENTS

| 4,123,489 | 10/1978 | Kelley .................................. 264/141 |
| 4,181,710 | 1/1980 | Dannelly et al. ....................... 424/33 |
| 5,290,560 | 3/1994 | Autant et al. ......................... 424/438 |
| 5,571,527 | * 11/1996 | Nishimura et al. ................... 424/438 |
| 5,744,178 | * 4/1998 | Ikeda et al. ............................. 426/2 |
| 5,807,594 | * 9/1998 | King et al. ............................... 426/2 |

FOREIGN PATENT DOCUMENTS 0 781 512   7/1997   (EP) .

* cited by examiner

*Primary Examiner*—Chhaya D. Sayala
(74) *Attorney, Agent, or Firm*—Oblon, Spivak, McClelland, Maier & Neustadt, P.C.

(57) ABSTRACT

A ruminant feed additive composition containing (A) lysine magnesium phosphate, (B) magnesium oxide, (C) a binder and (D) water, said water content being between 5 and 15% by weight, and processes for producing the composition.

7 Claims, No Drawings

RUMINANT FEED ADDITIVE COMPOSITION AND PROCESS FOR PRODUCING THE SAME

TECHNICAL FIELD

When biologically active substances such as amino acids and vitamins are orally administered directly into ruminants such as cow and sheep, most of these substances are decomposed by microorganisms in the rumen, and are, therefore, not utilized effectively. Accordingly, rumen bypass preparations for use in ruminants with which these biologically active substances are protected from the decomposition by microorganisms in the rumen but digested and absorbed in the abomasum and lower digestive organs are important in the field of ruminant feed, nutrients and drugs, etc.

In this respect, it is considered that biologically active substances should be protected with a material for protecting the same from gastric juice (its pH being in a neutral region) in the rumen of ruminants while allowing the same to dissolve in the abomasum (its pH being in an acidic region) and lower digestive organs.

The present invention relates to the protection of biologically active substances based on this concept. That is, the present invention relates to a ruminant feed additive composition and a process for producing the same. More specifically, the ruminant feed additive composition of the present invention contains physiologically active substances, namely, amino acids, especially lysine, and can easily be produced by an extrusion-granulating method.

DESCRIPTION OF THE BACKGROUND ART

With respect to the ruminant feed additive composition for the biologically active substances based on the concept described above (rumen bypass preparations), a great many proposals have been made.

That is, as a method for obtaining a ruminant feed additive to solve such problems, there is disclosed in JP-B-59-10780 and JP-A-60-168351, e.g., a method in which a biologically active substance is dispersed in a matrix containing a protective substance such as fats and oils and the dispersion is granulated. However, since a biologically active substance present on or in the vicinity of the surface of a particulate product is easily decomposed, the effect is reduced especially when the residence time in the rumen is long. Further, there is disclosed in JP-A-54-46823 and JP-A-63-317053 another method in which a core containing a biologically active substance is coated with a hydrophobic material such as fats and oils, etc. or an acid-sensitive material such as a basic high-molecular substance, etc. However, in case of a formula or compound feed, in particular, such coating is at times destroyed owing to the influence of other ingredient (s). Thus, the method can not be said to be an all-purpose method. Furthermore, there is disclosed in JP-A-9-172979 an animal feed additive composition containing a phosphoric acid amino acid composite salt insoluble in a neutral or alkaline aqueous solution but soluble in an acidic aqueous solution and an antacid. Such animal feed active composition is, however, difficult to granulate in such way that the said additive composition gets easy to handle and can be simply and easily added to an animal feed.

Meanwhile, with respect to a method for producing an active element particulate material through extrusion, Japanese Patent No. 2558023 (corresponding to JP-A-4-230318) discloses a method for granulating a nutritively or therapeutically active element composition containing the active element in an amount of more than 75% by weight, which comprises extruding the active element mass in the presence of a meltable binder (melt route method). Nevertheless, this method is a substitute for a method in which a mixture wet with the addition of water is extruded (U.S. Pat. No. 4,181, 710, wet route method), and it does not provide a method for extrusion-granulating a mixture having a fixed water content.

Accordingly, a ruminant feed additive composition of which the physiologically active substance is not decomposed in the rumen and is effectively utilized in the abomasum and lower digestive organs, that is, where resistance to rumen juice and dissolution in the abomasum are well-balanced, and which is easy to granulate, has not been obtained. That is, conventional rumen bypass preparations are problematic in their own biochemical and physical properties or their production method. Thus, the further improvement thereof has been in high demand.

(Problems That the Invention Is To Solve)

Accordingly, it is an object of the present invention to provide a ruminant feed additive composition where, when a ruminant feed additive contains a physiologically active substance, the physiologically active substance is fully protected in the rumen of a ruminant and rapidly dissolved in the abomasum, and which can easily be granulated by an extrusion-granulating method and the like, and a process for producing the same. In other words, in the background of the background art just described in the previous section, the present invention aims to provide a ruminant feed additive composition product of which the biochemical and physical properties (protection in the rumen and dissolution in the abomasum) are excellent, and an excellent process for producing a ruminant feed additive composition by which such a ruminant feed additive composition product can easily be produced.

(Means For Solving the Problems)

The present inventors have assiduously conducted investigations to achieve the object, and have consequently found that the object can be achieved by using, for a feed additive, lysine magnesium phosphate and magnesium oxide together, and further having a fixed water content. A first invention has been completed on the basis of these findings.

That is, the first invention relates to a ruminant feed additive composition containing (A) lysine magnesium phosphate, (B) magnesium oxide, (C) a binder and (D) water, the water content being between 5 and 15% by weight.

The invention further relates to a process for producing such a ruminant feed additive composition, which comprises (1) a step of mixing lysine magnesium phosphate, magnesium oxide and a binder, (2) a step of feeding water or steam (or water vapor) to the mixture, and (3) a step of extrusion-granulating the resulting hydrous (or water-containing) mixture.

The present inventors have assiduously conducted further investigations to achieve the object, and have consequently found that, in a method of producing a ruminant feed additive composition comprising coating a core (particle) containing a biologically active substance, for example, lysine magnesium phosphate, with a coating agent such as fats and oils, when said core is prepared by drying a particle formed by extrusion-granulating such a biologically active substance, a meltable binder, and water and, in addition, magnesium oxide as starting materials, under such conditions that the water contained therein is released as water vapor to render porous the structure of the particle and at the same time the resultant pores are filled with the molten binder present, and then the surface of the thus-formed dry particle (core) is coated with a coating agent, the object can easily be achieved. A second invention has been completed on the basis of these findings.

That is, the second invention relates to a process for producing a ruminant feed additive composition, which comprises uniformly mixing (a) lysine magnesium phosphate, (b) magnesium oxide, (c) a meltable binder and (d) water (in as small an amount as possible) required for extrusion granulation, subjecting this mixture to extrusion granulation at a temperature at which the meltable binder is not deteriorated, drying the resulting particle under such conditions that the water contained therein is released as water vapor to render porous the structure of the particle and at the same time the resulting resulting pores are filled with the molten binder present, and then coating the surface of the dry particle with a coating agent, as well as a process for producing a ruminant feed additive composition, which comprises uniformly mixing (a) lysine magnesium phosphate, (b) magnesium oxide and (c) a meltable binder, feeding this uniform powder mixture to an extrusion granulater for granulation while blowing (d) water before the die, drying the resulting particle under such conditions that the water contained therein is released as water vapor to render porous the structure of the particle and at the same time the resulting pores are filled with the molten binder present, and then coating the surface of the dry particle with a coating agent.

The present inventors have assiduously conducted still further investigations to achieve the object, and have consequently found that, in a method of producing a ruminant feed additive composition comprising coating a core (particle, granule) made from an amino acid as a biologically active substance, an oily binder, and water and, optionally, a filler with a coating agent such as fats and oils, when the porosity (of the particle) of the composition as the final product is adjusted to 20% or less, the object can easily be achieved. A third invention has been completed on the basis of these findings.

That is, the third invention relates to a process for producing a ruminant feed additive composition, which comprises uniformly mixing (a) an amino acid, (b) an oily binder having a melting point of 40° C. or more and (c) water required for extrusion granulation, and extrusion-granulating this mixture at a molten temperature of the oily binder, (molten temperature meaning a temperature at which something is in the molten state,) or uniformly mixing (a) an amino acid and (b) an oily binder having a melting point of 40° C. or more, feeding this uniform powder mixture to an extrusion granulater at a molten temperature of the oily binder for granulation while blowing (c) water before the die, drying the resulting particle, and as required or as desired, coating the surface of the dry particle with a coating agent such as fats and oils to form the particle having a porosity of 20% or less.

As is apparent from the foregoing description, the first to third inventions form a group of inventions so linked as to form a single general inventive concept.

(Mode For Carrying Out the Invention)

To begin with, the first invention will be described.

As the biologically active substance for the ruminant feed additive composition of the present invention, lysine magnesium phosphate can be mentioned. Such lysine magnesium phosphate may be, for example, lysine magnesium orthophosphate represented by the formula (1) below or lysine magnesium phosphite represented by the formula (2) below (refer to WO 96/17822).

$$(Lys)_a Mg_b H_c PO_4 \cdot nH_2O \tag{1}$$

wherein
(Lys) means lysine,
a is between 0.05 and 1.0,
b is between 1.0 and 1.47,
c is between 0 and 0.3,
$a+2 \times b+c=3$, and
n is between 0 and 20.

$$(Lys)_a Mg_b H_c PO_4 (PO_3)_m \cdot nH_2O \tag{2}$$

wherein
(Lys) means lysine,
a is between $0.02 \times (m+3)$ and $0.3 \times (m+3)$,
b is between $0.35 \times (m+3)$ and $0.49 \times (m+3)$,
c is between 0 and $0.2 \times (m+3)$,
$a+2 \times b+c=m+3$,
m is between 1 and 50, and
n is between 0 and 20.

The lysine magnesium phosphate is not particularly limited in solubility. Needless to say, it is advisable that the lysine magnesium phosphate is insoluble in a neutral or alkaline aqueous solution and soluble in an acidic aqueous solution.

The amount of lysine magnesium phosphate in the composition of the present invention is preferably between 25% and 80% by weight, especially preferably between 50% and 70% by weight based on the total amount of the composition from the standpoint that lysine can be protected well in the rumen of a ruminant while maintaining the effectiveness of lysine as a physiologically active substance.

The component (B) used for the ruminant feed additive composition of the present invention is magnesium oxide. Magnesium oxide is not particularly limited when it can generally be obtained. Preferable is magnesium oxide in which an iodine adsorption amount indicating a surface activity is approximately between 10 and 200 mg/g and an average particle diameter is approximately between 3 and 100 μm.

With respect to the amount of magnesium oxide in the composition of the present invention, Component (A) to Component (B) molar ratio is preferably in the range of from 3:1 to 1:4, especially more preferably in the range of from 2:1 to 1:3, from the standpoint that the composition can easily be produced and the physiologically active substance can satisfactorily be protected.

The component (C) used in the ruminant feed additive composition of the present invention is a binder. The binder is not particularly limited insofar as it can bind Components (A) and (B), and any water-soluble or hydrophobic binder is available.

Examples of the water-soluble binder include water-soluble polysaccharides such as starch, carboxymethyl cellulose salt, alginates, methyl cellulose, ethyl cellulose, hydroxypropyl cellulose and starch glycolic acid salt; water-soluble proteins such as sodium caseinate, gelatin and soybean protein; saccharides such as molasses, lactose and dextrin; and synthetic high-molecular substances such as polymethacrylates, polyvinyl alcohol and polyvinyl pyrrolidone.

Examples of the hydrophobic binder include natural waxes such as shellac resin, rosin, bees wax and paraffin wax; cetanol, higher fatty acids such as stearic acid and metal salts thereof; materials associated with fats and oils, such as animal and vegetable fats and oils, for example, palm oil and hardened animal and vegetable fats and oils; nonionic surfactants such as glycerin monostearate; and semi-synthetic resins and synthetic high-molecular substances such as acetyl cellulose, polyvinyl acetate, ester gum and coumarone resin.

Of these binders, higher fatty acids and materials associated with fats and oils are preferable in view of safety and the like. The above mentioned binders may be used either singly or in combination.

The amount of the binder can optionally be determined relative to the amounts of Components (A) and (B). A Component (B) to binder weight ratio is preferably in the range of from 10:1 to 1:3, especially preferably in the range of from 5:1 to 2:1.

The component (D) used for the ruminant feed additive composition of the present invention is water. Water can be added to the composition in an optional form such as water vapor. In the feed additive composition of the present invention, the water content is between 5 and 15% by weight based on the total amount of the composition in view of the easy handling in granulating and the shelf stability. The water content of the composition is preferably between 8 and 12% by weight.

The feed additive composition of the present invention may contain, along with the component (A), some other physiologically active substance. As the physiologically active substance, any known physiologically active substance can be used. Specific examples of such physiologically active substance include amino acids such as methionine, tryptophan and threonine; amino acid derivatives such as calcium salts of N-acylamino acid and N-hydroxymethyl methionine; amino acid hydroxy homologous compounds such as 2-hydroxy-4-methylmercaptobutyric acid and salts thereof; caloric sources such as starch, fatty acids and fatty acid metal salts; vitamins such as vitamin A, vitamin A acetate, vitamin A palpitate, vitamin B group, thiamine, thiamine hydrochloride, riboflavin, nicotinic acid, nicotinic acid amide, calcium panthotenate, choline panthotenate, pyridoxine hydrochloride, choline chloride, cyanocobalamin, biotin, folic acid, p-aminobenzoic acid, vitamin $D_2$, vitamin $D_3$ and vitamin E, as well as substances having the similar functions; tetracycline-type, amino-glycoside-type, macrolide-type and polyether-type antibiotics; insect repellents such as negphon; vermifuges such as piperazine; and hormones such as estrogen, stilbestrol, hexestrol, thyroprotein, goitrogen and growth hormone, etc.

Component (A) in the feed additive composition of the present invention is lysine magnesium phosphate. However, it is considered that a basic amino acid, other than lysine, which is capable of forming magnesium phosphate, can be added, like lysine, to the feed additive composition in the form of magnesium phosphate. Examples of such a basic amino acid include ornithine and arginine.

The feed additive composition of the present invention may contain inorganic materials such as a carbonate, a phosphate or a hydroxide of an alkaline earth metal, talc, bentonite, clay and finely divided silica, and organic materials such as paraffin wax, polyethylene powder, pulp powder, cellulose powder and chitosan in order to adjust the specific gravity, increase the feed additive in strength, enhance dissolution in the abomasum or increase the processability in granulation.

The feed additive composition of the present invention can be formed in an optional form or shape. In case of granulating, however, it is advisable that the average particle diameter is between 3 and 7 mm and the length is between 3 and 10 mm, in order to eliminate an uneven distribution of the additive composition in the feed and facilitate mixing with other components in the feed.

In the feed additive composition of the present invention, the protection of the physiologically active substance in the rumen of a ruminant can be increased by forming a coating layer around the core made from the above-mentioned components. With respect to examples of a coating material which can be used to form the coating layer, higher fatty acids, metal salts thereof and hardened animal and vegetable fats and oils among the examples of the above mentioned binders are preferably used from the standpoint of the adaptability of the core and the coating layer. The amount of the coating agent is not particularly limited. It is, however, preferably between 5 and 50% by weight, especially preferably between 7.5 and 30% by weight based on the total amount of the components of the core.

The feed additive composition of the present invention can be produced by any known process. For example, a process may be mentioned in which components are mixed and the mixture is then subjected to granulation such as extrusion granulation, rolling granulation, compression granulation or melt-spray granulation. Out of these processes, the feed additive composition of the present invention can preferably be produced by a process which comprises (1) a step of mixing lysine magnesium phosphate, magnesium oxide and a binder, (2) a step of providing water or water vapor to the mixture, and (3) a step of extrusion-granulating the resulting hydrous (or water-containing) mixture.

When the components are mixed in the step (1), any known mixing method can be employed. When water or water vapor is provided in Step (2), it is preferable that water is provided by blowing water vapor from the standpoint of the granulation, and that the amount of water to be provided is between 5 and 30% by weight based on the total amount of the composition. When the hydrous mixture is extrusion-granulated in Step (3), the procedure is not particularly limited. It is, however, advisable that the production is conducted using a known extrusion granulater under such conditions that the die temperature of the extrusion granulater is higher than a melting point of fats and oils as a binder.

When the coating layer is formed on the surface of the granular feed additive composition of the present invention, this may be any known method, e.g., a method in which the granular material as the core is first produced by the above-mentioned method, and after subjected to a drying step as required, is then sprayed onto with a coating agent. The coating layer is preferably formed by fluidizing the core while adding the coating agent thereto dropwise in a rolling fluidization granulater, or by fluidizing the core while spraying the coating agent thereto in a coating pan.

Next, the above-mentioned second invention will be described.

As the physiologically active substance for the ruminant feed additive composition of the present invention, lysine magnesium phosphate can be mentioned as in the first invention described above. Specific examples of lysine magnesium phosphate include lysine magnesium orthophosphate represented by Formula (1) and lysine magnesium phosphite represented by Formula (2) as in the first invention. Further, the solubility of lysine magnesium phosphate and the amount of lysine magnesium phosphate in the composition of the second invention are also the same as those described in connection with the first invention.

Incidentally, other biologically active substance can of course be used in combination with lysine magnesium phosphate, examples thereof being amino acids such as lysine, methionine, valine, leucine, isoleucine and arginine and vitamins. When methionine is used together, it is granulated in advance with the use of a binder to be described later, whereby the biochemical and physical properties can be improved (Examples 16 to 18 to be described later).

The function of magnesium oxide in the present invention is considered as follows. That is, when (granules of) the ruminant feed additive composition produced by the process of the present invention is fed to a ruminant to reach the rumen, magnesium oxide present in the vicinity of the surfaces of the granules is reacted with the phosphate ions or the carbonate ions present in a large amount in the rumen to form an insoluble salt whereby cementation is caused. Thus, the lysine magnesium phosphate present inside the granules as a biologically active substance is protected. Further, when a substance which forms an insoluble salt with magnesium in a neutral region, for example, stearic acid, is used as the meltable binder, the stearic acid is reacted with magnesium oxide in the molten state when granulated and dried to form an insoluble magnesium salt, which prevents fusion of granules. The amount of magnesium oxide having such functions is determined from the standpoint of the granulation (or granulatability) and the protection in the rumen, and it can usually be between 5 and 20%.

The meltable binder of the biologically active substance (lysine magnesium phosphate) is selected in view of the stability where a binder component is not deteriorated at a high temperature, the melting point, and the like. Examples thereof include fatty acids having form 14 to 22 carbon atoms, especially stearic acid, hardened soybean oil, hardened tallow, palm oil, and carnauba wax and other waxes. These can be used either singly or in combination. Sodium carboxymethyl cellulose can be used as an aid, as an aqueous binder. When such a binder is used, the extrusion granulation temperature can be set at such a low temperature of approximately 50° C. in terms of a temperature of pellets just after molding.

Lysine magnesium phosphate, magnesium oxide and a meltable binder must be of course mixed well prior to granulation. At this time, the mixing has to be conducted with a small amount of water being added. Unless a small amount of water is used, particles (pellets, granules, a granular product) are not formed even when this mixture is then fed to an extrusion granulater for granulation, and it remains as a powder. Meanwhile, when water is used in too large an amount, the mixture is too soft to conduct extrusion granulation. Or even when water is used in an amount capable of extrusion granulation, the load of a previous drying procedure is greater than as otherwise required, in the subsequent coating with fats and oils and the like.

Water can also be added before the die when the three components, lysine magnesium phosphate, magnesium oxide and a meltable binder are mixed well, followed by feeding the resulting powder mixture to a extrusion granulater. This has a merit of improvement of a throughput because starting materials in powder form can more easily be fed to an extrusion granulater, in comparison with the case described above where a mixture is formed upon using water and the mixture is subjected to the extrusion granulation.

Accordingly, in the process of the present invention, as small an amount of water as possible, required for extrusion granulation, is such amount that a mixture of lysine magnesium phosphate, magnesium oxide and a meltable binder can be granulated when applied to the extrusion granulater and the load of the previous drying procedure is not greater than as otherwise required in the subsequent coating. Such amount is between 3 and 35% in terms of a ratio occupying the starting materials to be granulated, for example, approximately 25%. In a given case, an appropriate amount of water can easily be determined by a skilled person through preliminary experiments.

According to the inventors' studies, the granular material composed of lysine magnesium phosphate, magnesium oxide and a meltable binder can be formed upon using water vapor instead of water as has been described above. That is, for example, it can also be obtained by blowing water vapor to a uniform mixture of lysine magnesium phosphate, magnesium oxide and a meltable binder to mix the same, and feeding the resulting mixture to an extrusion granulater for granulation. At this time, the amount of the water vapor, in terms of the amount of water, can of course be the same as the amount of water, namely, as small an amount of water as possible which is required in the extrusion granulation as described earlier. However, as stated above, for example, when methionine is preliminarily granulated, granules of methionine undergo at times melt-fracture at the temperature of the water vapor. Such a melt fracture is undesirable because the significance of the previous granulation is lost. An embodiment of using water vapor instead of using water directly is equivalent to the embodiment of using water directly because the water vapor is, like water, also used eventually for the granulation. Needless to say, this is included in the scope of the present invention, accordingly. However, when water vapor is used,an extra energy is consumed for forming the water vapor from water and then reducing this water vapor to water again.

The granulated material (granules) formed by using lysine magnesium phosphate, magnesium oxide, a meltable binder and water (moiety) can contain a filler, as desired, in order to increase the granular material in density. Incorporation of such a filler can of course be carried out by mixing lysine magnesium phosphate, magnesium oxide and a binder with the filler being added thereto.

The thus-obtained granulated mass (pellets, granules, a granular product) composed of lysine magnesium phosphate, magnesium oxide and a meltable binder is produced by cutting the extrudate obtained at the outlet of the die of an extrusion granulater using a rotary cutter or the like if required. Its form is therefore converted into a spherical form, as required, by appropriate means, for example, a "Marumerizer" to expedite the coating (oily coating). Further, it is sieved to an appropriate particle size as required, and then subjected to a drying treatment.

The granulated mass (granules) formed with the use of an extrusion granulater in this manner are then subjected to the drying treatment, and the conditions of the drying treatment are one of the characteristics of the present invention. That is, the drying conditions are of such that the structure of the granules gets, after dried, rendered porous and at the same time, the pores are filled with the molten binder (that is, the binder in the molten state enters the pores to fill the same. Such conditions can be realized upon using, for example, a fluidized bed drier. Specifically, when the granules are subjected to the drying treatment in which a fluidized bed drier is used, hot air of 90° C. is blown thereto (inlet temperature, 90° C.) and the drying operation is terminated when the temperature of the product reached 70° C. (outlet temperature, 70° C.), the water contained in the granules is released as water vapor, whereby the structure of the granules is rendered porous, and at the same time, the binder is melted at the temperature employed in the drying operation and the pores are filled therewith. With respect to the degree of drying, the water content is preferably between 0 and 15% from the standpoint of shelf stability. It is advisable that the drying temperature is as high as possible within such range that the binder is melted but not deteriorated. For example, it is approximately 75° C. This temperature is determined depending on the type of the binder (fatty acids, fats and oils and waxes which are different in melting point). Accordingly, the temperature is determined not absolutely but relatively. For example, when it is approximately 40° C., the binder is not melted, and although pores are present, the binder is not dipped therein. Accordingly, the rumen juice protection (or protection from rumen juice) is low for the following reasons.

As stated above, when water is evaporated during the drying treatment, the pores are formed in the granules of the granular product. At this time, there are merits that stearic acid used as the binder is melted and the pores are filled therewith to more tighten the granules of the dried granular product, and that due to the uneven surfaces of the granules formed by filling the pores in the granules with the molten binder, the coating agent is coated well on the surfaces of the granules in the coating treatment (which will be described next). The dried product is sieved as required, and then subjected to the subsequent coating treatment with, e.g., fats and oils.

The coating refers to coating of the granular material (hereinafter referred to at times as "core granules") produced as above using an extrusion granulater with a coating agent, of course, this procedure has to be conducted at such temperature that high-temperature deterioration of a binder component of core granules does not occur.

The coating agent is selected in view of its having a spray temperature that does not cause high-temperature deterioration of the binder component in the core granules, its stability in the formula or compound feed, its protection in the rumen and the degradation in the abomasum and lower digestive organs and the like. For example, a mixture of hardened tallow or hardened soybean oil, lecithin and palm oil can be mentioned. The degree of coating (an amount of the coating agent used) is also determined from the above-mentioned standpoint. It can be, for example, approximately 0.1 parts by weight per part by weight of the core granules.

The coating method per se with such a coating agent can be conducted using an ordinary technique in this field. It can be realized by, for example, a method in which granules (core granules) to be coated are maintained under a fluidized condition, while the coating agent is sprayed thereto, such as a method using a coater "GRX-300" ex by Freund Industrial Co., Ltd.

As stated above, the fats and oils as the binder can be used as the coating agent. One of the effects of the coating is, for example, the increase in the rumen juice resistance of the dry granules. This is because the coating layer prevents the rumen juice from being permeated into the granules.

The core granules after subjected to the coating treatment are cooled, and sieved if required to give a final product.

Finally, the above mentioned third invention will be described.

Preferable examples of the amino acid as the biologically active substance for the ruminant feed additive composition of the present invention include lysine, methionine, ornithine, valine, threonine, leucine and isoleucine which are limiting amino acids for ruminants. However, these are not critical, and glutamic acid and alanine are also available. Further, these amino acids may be in the form of a salt that the ruminant can take in.

As the form of the salt, for example, lysine magnesium phosphate as a lysine salt can be mentioned. Such lysine magnesium phosphate may be, for example, lysine magnesium orthophosphate represented by the above mentioned formula (1) or lysine magnesium phosphite represented by the above mentioned formula (2) as described with respect to the above mentioned first invention.

The solubility of these lysine magnesium phosphates is not particularly limited. Needless to say, it is preferable that they are insoluble in a neutral or alkaline aqueous solution but soluble in an acidic aqueous solution as is the case with the above mentioned first and second inventions.

The amount of the amino acid in the composition of the present invention is determined from the standpoint that the amino acid is protected well in the rumen of a ruminant while maintaining the effectiveness of the amino acid as the physiologically active substance. For example, in the case of the lysine magnesium phosphate, it is preferably between 25 and 80% by weight, especially preferably between 50 and 70% by weight based on the total amount of the composition.

Needless to say, the above-mentioned amino acids can be used either singly or in combination, and other biologically active substances, for example, vitamins and minerals, etc. can also be used together appropriately.

The oily binder having a melting point of 40° C. or more is a binder for a biologically active substance, and this is selected from the aspects of a stability and a melting point that do not cause high-temperature deterioration of a binder component. Examples thereof include fats and oils such as palm oil, hardened soybean oil and hardened tallow, fatty acids having from 14 to 22 carbon atoms, especially (powdery) stearic acid, and carnauba wax and other waxes, etc. These can be used either singly or in combination.

The granular product having a low porosity can be obtained through the extrusion granulation using such an oily binder. However, if water is used in too large an amount, the granulation is originally impossible (Comparative Example 9 to be described later). Even when it is possible, the porosity becomes too high due to the pores formed through evaporation of the water in the subsequent drying step. Meanwhile, when the porosity is too low, the product reaches the abomasum or lower digestive organs in such state that almost no rumen juice is permeated therein, so that the active ingredients of the granules is hardly released.

Incidentally, sodium carboxymethyl cellulose can be used, as an aid, as an aqueous binder.

The composition of the present invention can further contain optionally magnesium oxide, (powdery) stearic acid or the like as a filler. According to the present invention, stearic acid can be used both as a binder and as a filler.

The function of magnesium oxide in this third invention is the same as that of magnesium oxide in the second invention as described earlier.

The amino acid and the oily binder having a melting point of 40° C. or more as essential components (starting ingredients) and magnesium oxide, and (powdery) stearic acid, talc and silica as optional components (starting ingredients) are of course mixed well, and granulated. At this time, the mixing has to be conducted upon adding a small amount of water. Unless a small amount of water is used, particles (pellets, granules, a granular product) are not provided even by feeding the mixture to an extrusion granulater for granulation, and the mixture remains as a powder. On the other hand, when water is used in too large an amount, the mixture becomes too soft, and the extrusion granulation itself is impossible (Comparative Example 9 to be described later). Or, even when water is used in an amount in which the extrusion granulation is possible, the load of the previous drying procedure is greater than as otherwise required in the subsequent coating with fats and oils Further, water can be added before the die when the essential components (starting ingredients) and as desired, the optional components (starting ingredients) are mixed well and the resulting powder mixture is fed to the extrusion granulater. This provides a merit of an improvement of a throughput that in the form of the powder, the starting ingredients can more easily be fed to the extrusion granulater, in comparison with the above-described procedure of the present invention in which the mixture is formed using water and subjected to the extrusion granulation. Of course, water to be added before the die may be in the form of water vapor.

Accordingly, as small an amount of water as possible which is required for the extrusion granulation in the process of the present invention is an amount in which a mixture of the essential starting ingredients and the optional starting ingredients is granulated when applied to an extrusion granulater, and the load of the previous drying procedure in the subsequent coating is not greater than as otherwise required. This amount can be in the range of from 3 to 35%, for example, approximately 25% in terms of a ratio occupying the starting ingredients for granumation. The appropriate amount of water in a given case can easily be determined by a skilled person through preliminary experiments.

The granular material (granules) (constituting the composition) of the present invention can contain, as desired, other fillers such as talc and silica (these being also optional starting ingredients) for increasing the density of the granular material as required. Such incorporation can of course be carried out by adding to, and mixing with the amino acid, the oily binder and the other optional starting ingredients when mixed.

The uniform mixture of the essential and optional starting ingredients is extrusion-granulated. At this time, the temperature is, needless to say, a temperature at which the oily binder is in the molten state, namely the monten temperature of the oily binder.

The particles (pellets, granules, a granular product) which are composed of the essential starting ingredients and the optional starting ingredients, and which are obtained by the extrusion granulation are produced by cutting the extrudate at the outlet of the die of an extrusion granulater using a rotary cutter if required. Accordingly, for easy coating (oily coating), the form is converted into a spherical form by an appropriate method, for example, upon using a particle form adjusting machine "Marumerizer" (ex by Fuji Paudal) if required. Further, the granules are sieved to an appropriate particle size, as required, and then subjected to a drying treatment.

When the particle diameter of the granular product is too small, it is classified when added to a feed, preventing smooth intake by a ruminant. From this standpoint, it is advisable to use a die that gives particles having a particle diameter of approximately 4 mm or more (Examination Example 7 to be described later). Even when it is more than 20 mm, granules can be produced upon selecting a die. However, when such granules are administered to a milch cow, a milch cow crushes the same with its teeth. Thus, it is practically meaningless. The particles are hard to pass through the psalterium for the structural reason of digestive organs of a milch cow. Rumen juice gradually permeates the granule from the surface. Therefore, when an efficiency of passage through the digestive organs is approximately 24 hours, the rumen juice hardly reaches the centers of the granules. That is, the protection from rumen juice is increased, but the dissolution of the active ingredient in the granules in the abomasum and lower portions is decreased.

Accordingly, the particle diameter is between 4 and 15 mm in order to increase the protection from rumen juice, increase the dissolution of the active ingredient in the abomasum and the small intestine, prevent the crushing, and pass through digestive organs efficiently at a specific gravity of from 1.1 to 1.4 for about 24 hours.

The particles (granules) thus formed through an extrusion granulater are then subjected to the drying treatment. The conditions of the drying treatment are one of the characteristics of the present invention. That is, the conditions are of such that the oily binder compressed in the particles by the extrusion granulation bleeds out on the surfaces of the particles during the drying treatment to form shells of fats and oils on the surfaces of the treated particles. Such conditions can be realized upon using a fluidized bed drier. Specifically, the particles are subjected to such drying treatment that a fluidized bed drier is used, hot air of 90° C., for example, is blown (inlet temperature, 90° C.) therein and the drying operation is terminated when the temperature of the product or mass reaches 70° C. (outlet temperature, 70° C.). Then, the oily binder melts at the temperature where the drying treatment is carried out and bleeds out on the surfaces of the particles. When the dried particles discharged from the drier are cooled, the shells are formed on the surfaces thereof.

With respect to the degree of drying, the water content is preferably between about 3 and about 10% from the standpoint of the shelf stability. Since the water content of the particles before the drying is between about 3 and 15%, the drying treatment seems to be unnecessary in case of the water content of from 3 to 10%. However, unless the drying treatment is conducted, the surface shells of the oily binder are not formed. For this reason, the drying treatment is essential. The drying temperature is as high as possible within such range that the binder melts and no high-temperature deterioration occurs. For example, it is approximately 75° C. This temperature is, however, determined depending on the type of the binder used (fats and oils, fatty acids and waxes, etc.; these being different in melting point). Accordingly, it is determined not absolutely but relatively. For example, when it is approximately 40° C., the formation of shells with the oily binder is insufficient. Therefore, the protection from rumen juice(rumen juice resistance) is low for the following reasons.

The porosity is mostly determined in the drying treatment step, and almost unchanged in the subsequent coating treatment. The porosity is 20% or less, preferably between 3 and 20%. The lower the porosity, the higher the strength of the particles, and the rumen juice resistance is increased (Examination Examples 5 and 6 to be described later), but the dissolution of the active ingredient in the abomasum is decreased. When it is higher than 20%, the rumen juice resistance is low (Comparative Examples 7, 8 and 10). When the coating rate is increased, the rumen juice resistance is increased, but the dissolution of the active ingredient in the abomasum is decreased to that extent.

A desired porosity in a given case can easily be provided by a skilled person by referring to Examples to be described later and/or through simple preliminary experiments.

As stated above, there are merits that the particles of the granular product after dired are rendered stronger by the formation of the shells (surface shells) of the binder which has bled out on the surfaces of the granules during the drying treatment and that the coating agent such as oils and fats adheres better onto the surfaces of the particles in the coating treatment which will be described below. The dried granular product is, as required, sieved, and then subjected to the coating treatment with fats and oils or the like.

The coating refers to coating of the granular product (hereinafter referred to at times as "core granules") produced as above using an extrusion granulater. Needless to say, this procedure has to be conducted at such temperature that high-temperature deterioration of the binder component in the core granules is not induced.

The coating agent for the present invention is selected from the standpoint of its having a spray temperature that does not cause the high-temperature deterioration of the binder component of the core granules, its stability in the formula feed, its protection in the rumen and the degradation in the abomasum and lower digestive organs, and the like. For example, it is one or more of fats and oils such as palm oil, hardened tallow, hardened soybean oil, and lipids such as lecithin, and an optional mixture thereof (these being hereinafter called a fat-and-oil-type or oily coating agent used). More specifically, for example, a mixture of hardened tallow or hardened soybean oil, lecithin and palm oil can be mentioned. The degree of coating (amount of the coating agent used) is also determined from the above-mentioned standpoint. For example, it can be between 0.1 and 0.4 parts by weight (additional amount) per part by weight of the core granules.

The coating method per se with such a coating agent can be conducted upon employing an ordinary technique in this field as required. For example, it can be realized by, e.g., a method under which granules (core granules) to be coated are maintained in a fluidized state while a molten coating agent is sprayed thereto, for example, such as a method using a coater "GRX-300" ex Freund Industrial Co., Ltd.

As stated above, the fats and oils (for example, palm oil) included in the oily binder can be used as a fat-and-oil-type or oily coating agent. One of the effects of the coating is, for example, the increase in the rumen juice resistance of the dry granules by the coating. This occurs because the coating layer prevents the rumen juice from penetrating into the particles.

However, since an amino acid such as glutamic acid has a low solubility in water, the final coating treatment is not necessarily required. Unless the coating treatment is conducted, the product can be put into commercial circulation as a final product of a ruminant feed additive. In case of amino acids requiring the coating treatment, such as lysine and methionine, the product obtained by undergoing the drying treatment but not, or before, the coating treatment can be put into commercial circulation as an intermediate product.

The core granules which have undergone the coating treatment are cooled, and sieved as required to provide a final product.

The rumen juice resistance of a composition such as the feed additive composition of the present invention depends on the residence time in the rumen. From this standpoint as well, the composition of the present invention has the preferable property (Examination Example 8 to be described later).

EXAMPLES

The present invention is illustrated more specifically by referring to the following Examples. However, the invention is not limited thereto.

To begin with, Examples of the above-mentioned first invention are described.

[Production of a ruminant feed additive composition]

Example 1

Granulation Step

One hundred kilograms of dried lysine.magnesiumn-.phosphate (I-type crystals), 10 kg of magnesium oxide, 16.2 kg of powdery stearic acid, 28.4 kg of palm oil, 3.3 kg of ethyl cellulose and 12 kg of DL-methionine were mixed with a Nauta mixer for 40 minutes to form a uniform powder mixture.

This mixture was fed at rate of 100 kg/hr to a mixer "COM 1112-2 Model" ex California Pellet Mill fitted with a die having a diameter of 3 mm.

Water vapor was blown before the die, and the mixture was formed into pellets. L/D was between 1.0 and 3.0. In this case, the temperature in the mixer after blowing the water vapor was adjusted to between 50 and 65° C. Further, the pressure of the water vapor was between 0.5 and 0.6 $kg/cm^2$, and the amount of the water vapor was between 5 and 7 kg/hr.

The temperature of the pellets just after the formation was between 75 and 80° C., and the water content measured with a Kett water content meter was 12% (135° C., 20 minutes; an amount of a sample 6 g).

The resulting granular product was 180 kg.

Drying Step

The resulting granular product was dried with a fluidized bed drier. That is, hot air of 90° C. was blown therein. When the temperature of the mass reached 70° C., the drying operation was terminated. The dried granular product weighed 170 kg, and the water content measured with the Kett water content meter was 9.4%.

Coating Step

The coating was conducted using a "GRX-300" ex Freund Industrial Co., Ltd. That is, the granular product obtained by the above-mentioned method was sieved using a net (or sieve) having an opening size of 2 mm. A 135 g portion of the granular product which had passed through the net was charged into a coater. The product was being maintained at a temperature of from 53 to 55° C. A mixture of 12.5 kg of hardened soybean oil, 0.62 kg of lecithin and 0.38 kg of palm oil which mixture had been melted while being maintained at 70° C. was added thereto dropwise (the amount of the coating agent used being 9% based on the total amount; the coating with the coating agent in this ratio being hereinafter referred to as "9% coating") to obtain a composition weighing 143 kg. In this case, the suction air temperature was 52° C., the suction air amount was 60 $m^3$/min, and the suction air static pressure was 120 $mmH_2O$. Further, the exhaust air amount was approximately 65 $m^3$/min, and the exhaust air static pressure was 300 $mmH_2O$.

Example 2

Example 1 was repeated except that the amounts of palm oil and ethyl cellulose were changed to 8.8 kg and 0 kg, respectively, to obtain 151 kg of a granular product and 140 kg of a dried product. The water contents thereof measured with the Kett water content meter were 12.5% and 9.6%, respectively. A 135 kg of the dried glanular product was taken and subjected to the same coating procedure as that in Example 1 to obtain a composition weighing 140 kg.

Example 3

Example 1 was repeated except that the amounts of palm oil and ethyl cellulose were changed to 16.0 kg and 0 kg, respectively, to obtain 155 kg of a granular product and 141 kg of a dried product. The water contents thereof measured with the Kett water content meter were 12.2% and 9.6%, respectively. A 135 kg portion of the dried granular product was taken and subjected to the same coating procedure as that in Example 1 to obtain a composition weighing 140 kg.

Example 4

Example 1 was repeated except that the amounts of powdery stearic acid, palm oil and ethyl cellulose were changed to 32 kg, 0 kg and 0 kg, respectively, to obtain 174 kg of a granular product and 164 kg of a dried product. The water contents thereof measured with the Kett water content meter were 12.0% and 9.1%, respectively. A 135 kg portion of the dried granular product was taken and subjected to the same coating procedure as that in Example 1 to obtain 145 kg of a composition.

Example 5

Example 1 was repeated except that the amounts of palm oil, powdery stearic acid and ethyl cellulose were changed to 32 kg, 0 kg and 0 kg, respectively, to obtain 162 kg of a granular product and 151 kg of a dried product. The water contents thereof measured with the Kett water content meter were 12.2% and 9.3%, respectively. A 135 kg portion of the dried granular product was taken and subjected to the same coating procedure as that in Example 1 to obtain 142 kg of a composition.

Example 6

Example 1 was repeated except that the amount of magnesium oxide was changed to 7 kg to obtain 178 kg of a granular product and 169 kg of a dried product. The water contents thereof measured with the Kett water content meter were 12.1% and 9.1%, respectively. A 135 kg portion of the dried granular product was taken and subjected to the same coating procedure as that in Example 1 to obtain 144 kg of a composition.

Example 7

Example 1 was repeated except that the amount of magnesium oxide was changed to 27 kg to obtain 188 kg of a granular product and 176 kg of a dried product. The water contents thereof measured with the Kett water content meter were 11.5% and 8.9%, respectively. A 135 kg portion of the dried granular product was taken and subjected to the same coating procedure as that in Example 1 to obtain 144 kg of a composition.

Example 8

Example 1 was repeated except that the drying step was omitted after the granulation step, to obtain 162 kg of a granular product. The water content thereof measured with the Kett water content meter was 12.0%. A 135 kg portion of the dried granular product was taken and subjected to the same coating procedure as that in Example 1 to obtain 142 kg of a composition.

Example 9

Example 1 was repeated except that a mixture of 12.5 kg of hardened tallow, 0.62 kg of lecithin and 0.38 kg of palm oil was used as the coating agent (9% coating), to obtain 143 kg of a composition.

Example 10

Example 1 was repeated except that 13.5 kg of hardened soybean oil alone was used as the coating agent (9% coating), to obtain 140 kg of a composition.

Example 11

Example 1 was repeated except that a mixture of 12.8 kg of hardened soybean oil and 0.7 kg of lecithin was used as the coating agent (9% coating), to obtain 143 kg of a composition.

Example 12

Example 1 was repeated except that a mixture of 10.1 kg of hardened soybean oil, 0.5 kg of lecithin and 0.3 kg of palm oil was used as the coating agent (7.5% coating), to obtain 142 kg of a composition.

Example 13

Example 1 was repeated except that a mixture of 22 kg of hardened soybean oil, 1.09 kg of lecithin and 0.67 kg of palm oil was used as the coating agent (15% coating), to obtain 145 kg of a composition.

Example 14

Five kilograms of the dried granular product in Example 1 were charged into a concrete mixer, and the mixer was rotated. Hot air was blown therein, and the temperature of the mass was adjusted to between 45 and 47° C. 0.5 kg of hardened tallow (9% coating) which had been melted while being maintained at 70° C. was sprayed thereto using a spray nozzle for coating, to obtain 5.1 kg of a composition.

[Evaluation of properties of ruminant feed additive composition]

Examination Example 1

The compositions obtained in Examples 1 to 14 were evaluated by the following methods. That is, 1.5 g of each composition were charged into a 300-milliliter three-necked flask, and 200 ml of a 0.2 M phosphate buffer were added thereto as a model rumen juice. The mixture was shaken at 39° C. and 100 rpm for 20 hours, and then subjected to the amino acid analysis through HPLC to find a rumen protection rate (Calculation formula: 100%—Dissolution rate (%) in a model rumen juice). Subsequently, 8 ml of acetic acid were added thereto as a model abomasum juice. The resulting mixture was shaken under the same conditions for 4 hours, and subjected to the amino acid analysis to find an abomasum dissolution rate (Calculation formula: Dissolution rate (%) in a model abomasum juice—Dissolution rate (%) in the model rumen juice (%)).

The results of the evaluation are shown in Table 1 below.

TABLE 1

| | Lysine | | Methionine | |
| --- | --- | --- | --- | --- |
| | Rumen protection rate | Abomasum dissolution rate | Rumen protection rate | Abomasum dissolution rate |
| Example 1 | 85% | 45% | 80% | 40% |
| Example 2 | 80% | 50% | 75% | 45% |
| Example 3 | 85% | 55% | 78% | 49% |
| Example 4 | 90% | 41% | 85% | 35% |
| Example 5 | 88% | 43% | 80% | 36% |
| Example 6 | 78% | 40% | 71% | 32% |
| Example 7 | 86% | 46% | 82% | 41% |
| Example 8 | 85% | 50% | 81% | 42% |
| Example 9 | 90% | 48% | 86% | 42% |
| Example 10 | 77% | 41% | 69% | 39% |
| Example 11 | 74% | 43% | 70% | 40% |
| Example 12 | 75% | 51% | 72% | 46% |

TABLE 1-continued

|  | Lysine | | Methionine | |
| --- | --- | --- | --- | --- |
|  | Rumen protection rate | Abomasum dissolution rate | Rumen protection rate | Abomasum dissolution rate |
| Example 13 | 95% | 35% | 90% | 31% |
| Example 14 | 81% | 46% | 75% | 38% |

From Table 1, it becomes clear that lysine and methionine as physiologically active substances are both protected effectively from the degradation in the rumen, and dissolved well in the abomasum.

Next, Examples of the above-mentioned second invention will be described.

Example 15

(a) Granulation step:

One hundred kilograms of dried lysine magnesium phosphate (orthophosphate produced by the method described in WO 96/17822), 10 kg of magnesium oxide, 16.2 kg of powdery stearic acid, 28.4 kg of palm oil and 2.0 kg of sodium carboxymethyl cellulose were mixed with a Nauta mixer for 40 minutes to form a uniform powder mixture.

This mixture was fed to a mixer "CPM 112-2 Model" fitted with a die having a diameter of 3 mm ex California Pellet Mill at a rate of 100 kg/hr. Water was continuously added before the die at such rate that the amount of water became 30 kg based on the total powder mixture, while the resulting mixture was being formed into pellets. L/D was between 1.3 and 3.0.

The temperature of the pellets just after the formation was between 45 and 55° C., and the water content measured with the Kett water content meter was 22.5% (measuring conditions: 6 g sample, 135° C. for 20 minutes). The resulting granular product was 175 kg.

(b) Drying step:

The resulting granular product was dried with a fluidized bed drier to obtain granules in which pores formed after releasing water as water vapor were filled with the molten binder. Specifically, hot air of 90° C. was blown therein. When the temperature of the mass reached 70° C., the drying was terminated. The dried granular product was 140 kg, and the water content measured with the Kett water content meter was 9%.

(c) Coating step:

With respect to the coating, the coating with fats and oils was conducted using a "GRX-300" ex Freund Industrial Co., Ltd.

That is, the granular product (granules) obtained by the above-mentioned drying step (b) was sieved using a net having an opening size of 2 mm. The granular product (135 kg) on the sieve was charged into a coater. The product was maintained at from 53 to 55° C. A mixture composed of 12.5 kg of hardened a soybean oil, 0.62 kg of lecithin and 0.38 kg of palm oil which mixture had been melted while being maintained at 70° C. was added thereto dropwise (the amount of the coating agent used being 9% based on the total amount; the coating with the coating agent in this ratio being hereinafter referred to as "9% coating"). In this case, the suction air temperature was 52° C., the suction air amount was 60 m³/min, and the suction air static pressure was 120 mmH₂O. Further, the exhaust air amount was approximately 65 m³/min, and the exhaust air static pressure was 300 mmH₂O.

Example 16

(Use of two types of biologically active substances in combination)

(a) One hundred kilograms of dried lysine magnesium phosphate (same as that used in Example 15), 20 kg of magnesium oxide, 16.2 kg of powdery stearic acid, 12 kg of DL-methionine and 2.0 kg of sodium carboxymethyl cellulose were mixed with a Nauta mixer for 40 minutes to form a uniform powder mixture.

This mixture was fed to a mixer fitted with a die having a diameter of 3 mm as supplied by California Pellet Mill at a rate of 100 kg/hr. Water was continuously added thereto before the die at such ratio that the amount of water became 30 kg based on the total powder mixture, while the resulting mixture was being formed into pellets. L/D was between 1.0 and 3.0.

The temperature of the pellets just after the formation was between 45 and 55° C., and the water content measured with the Kett water content meter was 24.2%. The resulting granular product was 174 kg.

(b) The same drying procedure as in Example 15 was conducted to obtain 139 kg of a dried product. The water content measured with the Kett water content meter was 9.9%.

(c) The same coating as in Example 15 was conducted using 135 kg of the resulting dried product to obtain 143 kg of a coated product.

Example 17

(Previous granulation of an active substance (1))

(a) One hundred kilograms of DL-methionine and 30.0 kg of powdery stearic acid were mixed with a Nauta mixer for 40 minutes to form a uniform powder mixture.

This mixture was fed to a mixer fitted with a die having a diameter of 1.5 mm as supplied by California Pellet Mill at a rate of 100 kg/hr while being heated with hot air of 80° C., and was formed into pellets. L/D was between 1.0 and 3.0.

The temperature of the pellets just after the formation was between 45 and 55° C. The resulting methionine granules were 128 kg.

(a') One hundred kilograms of dried lysine magnesium phosphate (same as that in Example 15), 10kg of magnesium oxide, 12.7 kg of powdery stearic acid, 28.4 kg of palm oil, 15.0 kg of the above-mentioned methionine granules and 2.0 kg of sodium carboxymethyl cellulose were mixed with a Nauta mixer for 40 minutes to form a uniform powder mixture. This mixture was fed to a mixer fitted with a die having a diameter of 3 mm as supplied by California Pellet Mill at a rate of 100 kg/hr. Water was continuously added thereto before the die in such ratio that the amount of water became 30 kg based on the total powdery mixture, while the resulting mixture was being formed into pellets. L/D was between 1.0 and 3.0.

The temperature of the pellets just after the formation was between 45 and 55° C., and the water content measured with the Kett water content meter was 21.3%. The resulting granular product was 190 kg.

(b) The same drying procedure as in Example 15 was conducted to obtain 144 kg of a dried product. The water content measured with the Kett water content meter was 8.7%.

(c) The same coating procedure as in Example 15 was conducted using 135 kg of the resulting dried product to obtain 143 kg of the coated product.

Example 18

(same as above (2))

(a) One hundred kilograms of DL-methionine and 30.0 kg of hardened soybean oil were mixed with a Nauta mixer for 40 minutes to form a uniform powder mixture.

This mixture was fed to a mixer fitted with a die having a diameter of 1.5 mm as supplied by California Pellet Mill at a rate of 100 kg/hr while being heated with hot air of 80° C., and was formed into pellets. L/D was between 1.0 and 3.0.

The temperature of the pellets just after the formation was between 55 and 65° C. The resulting methionine granules were 127 kg.

(a') One hundred kilograms of dried lysine magnesium phosphate (same as that in Example 15), 10 kg of magnesium oxide, 12.7 kg of hardened soybean oil, 15.0 kg of the above-mentioned methione granules and 2.0 kg of sodium carboxymethyl cellulose were mixed with a Nauta mixer for 40 minutes to form a uniform powder mixture.

This mixture was fed to a mixer fitted with a die having a diameter of 3 mm as supplied by California Pellet Mill at a rate of 100 kg/hr. Water was continuously added thereto before the die at such ratio that the amount of water became 30 kg based on the total powder mixture, while the resulting mixture was being formed into pellets. L/D was between 1.0 and 3.0.

The temperature of the pellets just after the formation was between 45 and 55° C., and the water content measured with the Kett water content meter was 25%. The resulting granular product was 164 kg.

(b) The same drying procedure as in Example 15 was conducted to obtain 130 kg of a dried product. The water content measured with the Kett water content meter was 10.5%.

(c) The same coating procedure as in Example 15 was conducted using 120 kg of the resulting dried product to obtain 125 kg of the coated product.

Example 19

(Use of hardened soybean oil as the main binder)

Example 15 was repeated except that gardened soybean oil was used instead of the powdery stearic acid, to obtain 180 kg of a granular product and 141 kg of a dried product. The water contents thereof measured with the Kett water content meter were 23% and 9.1%, respectively. A 135 kg portion of the dried granular product was taken and subjected to the same coating procedure as that in Example 15, to obtain 145 kg of a coated product.

Example 20

(Use of wax as the main binder)

Example 15 was repeated except that carnauba wax was used instead of the powdery stearic acid, to obtain 178 kg of a granular product and 140 kg of a dried product. The water contents thereof measured with the Kett water content meter were 23% and 9.2%, respectively. A 135 kg portion of the dried granular product was taken and subjected to the same coating procedure as that in Example 15, to obtain 145 kg of a coated product.

Example 21

(Reduction of the amount of magnesium oxide)

Example 15 was repeated except that 7 kg, instead of 10 kg, of magnesium oxide was used, to obtain 175 kg of a granular product and 138 kg of a dried product. The water contents thereof measured with the Kett water content meter were 23% and 9.3%, respectively. A 135 kg portion of the dried granular product was taken and subjected to the same coating procedure as that in Example 15, to obtain 144 kg of a coated product.

Example 22

(Increase of the amount of magnesium oxide)

Example 15 was repeated except that 27 kg, instead of 10 kg, of magnesium oxide was used, to obtain 190 kg of a granular product and 150 kg of a dried product. The water contents thereof measured with the Kett water content meter were 20.6% and 8.3%, respectively. A 135 kg portion of the dried granular product was taken and subjected to the same coating procedure as that in Example 15, to obtain 144 kg of a coated product.

Example 23

(Use of hardened tallow as the main coating agent)

Example 15 was repeated except that a mixture of 12.5 kg of hardened tallow, 0.62 kg of lecithin and 0.38 kg of palm oil was used as the coating agent (9% coating), to obtain 143 kg of a coated product.

Example 24

(Use of hardened soybean oil alone as the coating agent)

Example 15 was repeated except that 13.5 kg of hardened soybean oil was alone used as the coating agent (9% coating), to obtain 140 kg of a coated product.

Example 25

(Use of hardened soybean oil as the main coating agent)

Example 15 was repeated except that a mixture of 12.8 kg of hardened soybean oil and 0.7 kg of lecithin was used as the coating agent (9% coating), to obtain 143 kg of a coated product.

Example 26

(Reduction of the amount of the coating agent: 7.5% coating)

Example 15 was repeated except that a mixture of 10.1 kg of hardened soybean oil, 0.5 kg of lecithin and 0.3 kg of palm oil was used as the coating agent (7.5% coating), to obtain 142 kg of as coated product.

Example 27

(Increase of the amount of the coating agent: 15% coating) Example 15 was repeated except that a mixture of 22 kg of hardened soybean oil, 1.09 kg of lecithin and 0.67 kg of palm oil was used as the coating agent (15% coating), to obtain 145 kg of a coated product.

Comparative Example 1

(Excessive reduction of the amount of magnesium oxide)

Example 15 was repeated except that the amount of magnesium oxide was changed to 4 kg, to obtain 170 g of a granular product and 138 kg of a dried product. The water contents thereof measured with the Kett water content meter were 23.9% and 9.5%, respectively. The same coating procedure as in Example 15 was conducted using 135 kg of the dried granular product to obtain 140 kg of a coated product.

Comparative Example 2

(Insufficient Drying Temperature)

Example 15 was repeated except that after the granulation step, the drying step was conducted under such condition that hot air of 70° C. was blown and the drying was terminated when the temperature of the mass reached 60° C. Then, the granular product was obtained in an amount of 162 kg. This granuler product was rendered porous to an unsatisfactory extent because the drying temperature was too low, and the pores were filled with the molten binder unsatisfactorily. The water content measured with the Kett water content meter was 12.0%. The same coating procedure as in Example 15 was conducted using 135 kg of the dried granular product to obtain 142 kg of a coated product.

Comparative Example 3

(Excessive Reduction of the Amount of the Coating Agent)

Example 15 was repeated except that a mixture of 6.3 kg of hardened soybean oil, 0.31 kg of lecithin and 0.19 kg of palm oil was used as the coating agent (5% coating), to obtain 140 kg of a coated product.

Comparative Example 4

(Excessive Increase of the Amount of the Coating Agent)

Example 15 was repeated except that a mixture of 31.3 kg of hardened soybean oil, 1.55 kg of lecithin and 0.95 kg of palm oil was used as the coating agent (20% coating), to obtain 143 kg of a coated product.

Examination Example 5

Each (1.5 g) of the coated products obtained in Examples 15 to 27 and Comparative Examples 1 to 4 was taken, and evaluated by the same methods as in Examination Example 1. The results of the evaluation are shown in Table 2 below.

TABLE 2

|  | Lysine | | Methionine | |
| --- | --- | --- | --- | --- |
| Coated product | Rumen protection rate | Abomasum dissolution rate | Rumen protection rate | Abomasum dissolution rate |
| Example 15 | 95% | 35% | — | — |
| Example 16 | 85% | 50% | 75% | 45% |
| Example 17 | 90% | 40% | 80% | 40% |
| Example 18 | 95% | 38% | 85% | 35% |
| Example 19 | 95% | 32% | — | — |
| Example 20 | 97% | 30% | — | — |
| Example 21 | 90% | 30% | — | — |
| Example 22 | 97% | 35% | — | — |
| Example 23 | 90% | 38% | — | — |
| Example 24 | 83% | 40% | — | — |
| Example 25 | 86% | 39% | — | — |
| Example 26 | 89% | 33% | — | — |
| Example 27 | 97% | 29% | — | — |
| Comparative Example 1 | 56% | 10% | — | — |
| Comparative Example 2 | 38% | 9% | — | — |
| Comparative Example 3 | 41% | 11% | — | — |
| Comparative Example 4 | 100% | 5% | — | — |

Finally, Examples of the above-mentioned third invention are described.

Example 28

Lysine hydrochloride (460 g), 90 g of DL-methionine, 138 g of magnesium oxide, 166 g of powdery stearic acid, 61 g of palm oil, 9 g of sodium carboxymethyl cellulose and 73 g of talc were mixed with a ribbon mixer for 20 minutes to obtain a uniform mixture.

This mixture was fed to a mixer (extrusion granulater) "CPM" fitted with a die having a diameter of 6 mm as supplied by California Pellet Mill (CPM). Water vapor was blown before the die, and the mixture was formed into pellets. L/D was between 1.0 and 3.0. In this case, the temperature inside the mixer was adjusted to between 60 and 65° C. after blowing the water vapor. Further, at this time, the pressure of the water vapor was between 0.5 and 0.6 kg/cm$^2$, and the amount thereof was between 5 and 7 kg/hr.

The resulting pellets were dried with a fluidized bed drier "Multiplex" (supplied by Fuji Paudal). Hot air of 90° C. was blown therein, and when the temperature of the mass reached 75° C., the drying operation was terminated. The dried granular product weighed 970 g, and the water content measured with the Kett water content meter was 7.1% (135° C. for 20 minutes; sample amount, 6 g).

The coating was conducted using a "Spir' A' Flow 5 Model" supplied by Freund Industrial Co., Ltd. That is, the granulated product obtained by the above-mentioned method was sieved using a net having an opening size of 4 mm. The remaining product (900 g) to be coated which had a particle diameter of 4 mm or more was charged into a coater. The temperature of the mass was maintained at from 52 to 55° C., while a mixture (coating agent) comprising 164 g of hardened soybean oil, 8 g of lecithin and 8 g of palm oil which mixture had been melted while being maintained at 70° C., was added thereto dropwise (20% coating) to obtain 1,045 g of a composition. The 20% coating here referred to indicates that the amount of the coating agent to the product coated is 20% by weight (this applying hereinafter).

Example 29

Example 28 was repeated except that a die having a diameter of 4.5 mm was used to obtain 965 g of a dried product. L/D was between 1.0 and 3.0, and the water content measured with the Kett water content meter was 7.0%.

The same coating procedure as in Example 28 was conducted using a 900 g portion of the dried product to obtain 1,045 g of a composition.

Example 30

Example 28 was repeated except that neither powdery stearic acid nor palm oil was used but 100 g of hardened soybean oil was used, and the drying operation was omitted, to obtain 880 g of a granulated product. L/D was between 1.0 and 3.0, and the water content measured with the Kett water content meter was 6.5%.

A 800 g potion of the dried product was dropwise added with a mixture of 182 g hardened soybean oil, 9 g lecithin and 9 g of palm oil (25% coating), to obtain 970 g of a composition.

Example 31

Example 28 was repeated except that 60 g powdery stearic acid and 166 g of palm oil, to obtain 975 g of a dried product. L/D was between 1.0 and 3.0, and the water content measured with the Kett water content meter was 7.1%.

The same coating procedure as in Example 28 was conducted using a 900 g portion of the dried product to obtain 1,085 g of a composition.

Example 32

Example 28 was repeated except that no powdery stearic acid and 100 g of palm oil were used and the drying operation was omitted, to obtain 890 g of a granulated product. L/D was between 1.0 and 3.0, and the water content measured with the Kett water content meter was 7.3%.

A 800 g portion of the granulated product was dropwise added with a mixture of 182 g of hardened soybean oil, 9 g of lecithin and 9 g of palm oil (25% coating), to obtain 970 g of a composition.

Example 33

Six-hundred grams of dried lysine.magnesium.phosphate (described in WO 96/17822 and JP-A-9-59232), 72 g of DL-methionine, 60 g of magnesium oxide, 97 g of powdery stearic acid and 170 g of palm oil were mixed with a ribbon mixer for 20 minutes to form a uniform powder mixture.

This mixture was fed to a mixer fitted with a die having a diameter of 4.5 mm as supplied by California Pellet Mill (COM). Water vapor was blown before the die, and the mixture was formed into pellets. At this time, the temperature inside the mixer after blowing the water vapor was adjusted to between 60 and 65° C. Further, at this time, the pressure of the water vapor was between 0.5 and 0.6 kg/cm$^2$, and the amount thereof was between 5 and 7 kg/hr.

The resulting pellets were dried with the fluidized bed drier. When hot air of 90° C. was blown and the temperature of the mass reached 75° C., the drying operation was terminated. The dried granular product weighed 980 g. L/D was between 1.0 and 3.0, and the water content measured with the Kett water content meter was 12%.

A 900 g portion of this product was dropwise added with a mixture of 82 g of hardened soybean oil, 4 g of lecithin and 4 g of palm oil (10% coating procedure), to obtain 1,000 g of a composition.

Example 34

DL-methionine (616 g), 117 g of magnesium oxide, 140 g of powdery stearic acid, 59 g of palm oil, 6 g of sodium carboxymethyl cellulose and 61 g of talc were mixed with a ribbon mixer for 20 minutes to obtain a uniform powder mixture. The same procedure as in Example 28 was conducted to obtain 950 g of a dried product. L/D was between 1.0 and 3.0, and the water content measured with the Kett water content meter was 2.0%.

Nine-hundred grams of this product were used, and a mixture of 129 g of hardened palm oil, 7 g of lecithin and 14 g of palm oil was added thereto dropwise (15% coating procedure), to obtain 970 g of a composition.

Example 35

L-alanine (622 g), 118 g of magnesium oxide, 140 g of powdery stearic acid, 51 g of palm oil, 6 g of sodium carboxymethyl cellulose and 62 g of talc were mixed with a ribbon mixer for 20 minutes to obtain a uniform powder mixture. The same procedure as in Example 28 was conducted to obtain 930 g of a dried product. L/D was between 1.0 and 3.0, and the water content measured with the Kett water content meter was 7.6.

A 900 g portion of this product was taken and subjected to the same coating operation as in Example 34, to obtain 980 g of a composition.

Example 36

Example 35 was repeated except that L-glutamic acid was used instead of the L-alanine, to obtain 945 g of a dried product. L/D was between 1.0 and 3.0, and the water content measured with the Kett water content meter was 7.9%.

A 900 g portion of the product was taken and subjected to the same coating procedure as in Example 34, to obtain 975 g of a composition.

Example 37

475 g of lysine hydrochloride, 95 g of DL-methionine, 103 g of L-glutamic acid, 143 g of magnesium oxide, 101 g of palm oil, 6 g of sodium carboxymethyl cellulose and 76 g of talc were mixed with a ribbon mixer for 20 minutes to obtain a uniform powder mixture. The same procedure as in Example 28 was conducted to obtain 970 g of a dried product. L/D was between 1.0 and 3.0, and the water content measured with the Kett water content meter was 6.9%.

The same coating procedure as in Example 28 was conducted using a 900 g portion of this product to obtain 1,022 g of a composition.

Comparative Example 5

Example 28 was repeated except that a die having a diameter of 3 mm was used to obtain 980 g of a dried product. L/D was between 2.0 and 4.0, and the water content measured with the Kett water content meter was 6.8%.

A 900 g portion of this product was subjected to the same coating procedure to obtain 1,035 g of a composition.

Comparative Example 6

Example 28 was repeated except that a die having a diameter of 1.5 mm was used to obtain 960 g of a dried product. L/D was between 3.0 and 5.0, and the water content measured with the Kett water content meter was 5.3%.

The same coating procedure as in Example 28 was conducted using a 900 g portion of this product to obtain 1,005 g of a composition.

Comparative Example 7

Lysine hydrochloride (460 g), 90 g of DL-methionine, 138 g of magnesium oxide, 3 g of sodium carboxymethyl cellulose, 73 g of talc and 180 g of water were mixed with a ribbon mixer for 20 minutes to form a uniform mixture.

This mixture was fed to a mixer fitted with a die having a diameter of 6 mm as supplied by California Pellet Mill (CPM), and was formed into pellets. L/D was between 1.0 and 3.0. The resulting pellets were dried with a fluidized bed drier. That is, hot air of 90° C. was blown therein, and when the temperature of the mass reached 75° C., the drying operation was terminated. The dried granulated product weighed 760 g, and the water content measured with the Kett water content meter was 1.2% (135° C., 20 minutes; sample amount, 6 g).

The same coating as in Example 28 was conducted using a 700 g portion of this product (20% coating) to obtain 820 g of a composition.

Comparative Example 8

Comparative Example 7 was repeated except that the coating rate was 40%, to obtain 830 g of a composition.

Comparative Example 9

Lysine hydrochloride (460 g), 90 g of DL-methionine, 138 g of magnesium oxide, 166 g of powdery stearic acid, 61 g of palm oil, 9 g of sodium carboxymethyl cellulose, 73 g of talc and 300 g of water were mixed with a ribbon mixer for 20 minutes to form a uniform powder mixture.

This mixture was fed to a mixer fitted with a die having a diameter of 6 mm as supplied by California Pellet Mill (CPM) for formation into pellets. However, a clay-like product alone was discharged, and the CPM was finally stopped owing to an excess load. Thus, the granulation was impossible.

Comparative Example 10

A powder mixture having the same composition as in Comparative Example 9 was charged into a Herschel mixer, and granulated. The resulting product was sieved to obtain 1,200 g of spherical granules having a particle diameter of from 5.4 to 6.2 mm. The same drying procedure as in Example 28 was conducted to obtain 800 g of a dried product. The water content measured with the Kett water content meter was 9.5%.

The coating was conducted as in Example 28 using the whole dried product to obtain 850 g of a composition.

Examination Example 3

(Evaluation of rumen juice resistance of a ruminant feed additive composition)

The compositions obtained in Examples 28 to 37 and Comparative Examples 5 to 8 and 10 were evaluated by the following method. That is, a nylon bag containing 1 g of the composition was put into the rumen of a cow fitted with a rumen fistula. After 24 hours, the bag was taken out, washed with water, and dried (nylon bag test). The dried composition was dissolved in 100 ml of dilute hydrochloric acid, and the amino acid analysis was conducted through HPLC (high performance liquid chromatography) to find the rumen juice resistance of each amino acid.

The results of the evaluation of the compositions in Examples are shown in Table 3 below, and the results of the evaluation of the compositions in Comparative Examples in Table 4 below, respectively.

The rumen juice resistance here referred to is calculated using the following formula (1).

$$P = (Ca/Cf) \times 100 \quad (1)$$

wherein

P: rumen juice resistance (%),

Ca: amino acid concentration (mg/dl) after the nylon bag test, and

Cf: amino acid concentration (mg/dl) before the nylon bag test.

TABLE 3

| | Rumen juice resistance (%) | | | | | | | | | |
|---|---|---|---|---|---|---|---|---|---|---|
| Example | 28 | 29 | 30 | 31 | 32 | 33 | 34 | 35 | 36 | 37 |
| Lysine | 75 | 70 | 83 | 73 | 86 | 90 | | | | 75 |
| Methionine | 84 | 76 | 85 | 81 | 89 | 85 | 85 | | | 77 |
| Alanine | | | | | | | | 80 | | |
| Glutamic acid | | | | | | | | | 93 | 77 |

TABLE 4

| | Rumen Juice resistance (%) | | | | |
|---|---|---|---|---|---|
| Comparative Example | 5 | 6 | 7 | 8 | 10 |
| Lysine | 45 | 15 | 25 | 100 | 29 |
| Methionine | 47 | 20 | 30 | 100 | 31 |

Examination Example 4

(Evaluation of an abomasum dissolution of a ruminant feed additive composition)

The compositions obtained in Examples 28 to 37 and Comparative Examples 5 to 8 and 10 were evaluated by the following method. That is, after the nylon bag test in Examination Example 3 was conducted, the dried composition was charged into 200 ml of an acetate buffer of a pH 2.2 corresponding to an abomasum juice, and the mixture was shaken at 100 rpm for 2 hours. The solution shaken was subjected to the amino acid analysis through HPLC to find an abomasum dissolution (dissolution rate).

The results of the evaluation are shown in Tables 5 and 6 below.

The abomasum dissolution here referred to is calculated using the following formula (2).

$$D = ((Ca - Cb)/Cf) \times 100 \quad (2)$$

wherein

D: abomasum dissolution rate (%),

Ca: same as in Formula (1),

Cb: amino acid concentration (mg/ml) after acetate buffer shaking, and

Cf: amino acid concentration (mg/ml) before a nylon bag test.

TABLE 5

| | Rumen juice resistance (%) | | | | | | | | | |
|---|---|---|---|---|---|---|---|---|---|---|
| Example | 28 | 29 | 30 | 31 | 32 | 33 | 34 | 35 | 36 | 37 |
| Lysine | 35 | 43 | 28 | 38 | 45 | 51 | | | | 38 |
| Methionine | 30 | 40 | 26 | 32 | 42 | 47 | 24 | | | 37 |
| Alanine | | | | | | | | 46 | | |
| Glutamic acid | | | | | | | | | 30 | 33 |

TABLE 6

| | Rumen juice resistance (%) | | | | |
|---|---|---|---|---|---|
| Comparative Example | 5 | 6 | 7 | 8 | 10 |
| Lysine | 18 | 10 | 12 | 0 | 18 |
| Methionine | 14 | 8 | 10 | 0 | 16 |

The above tables 3 to 6 reveal that the amino acids as biologically active substances are effectively protected from the degradation by the rumen juice and dissolved in the solution corresponding to the abomasum juice.

Examination Example 5

(Evaluation of strength of a ruminant feed additive composition)

The compositions obtained in Examples 28 to 37 and Comparative Examples 5 to 8 and 10 were evaluated by the following method. That is, the strength of the compositions was measured using a strength-measuring device having a balance weight of 10 kg ("Grano" supplied by Okada Seiko K.K.). The measurement was conducted 10 times for each composition, and the average strength was obtained.

The results are shown in Tables 7 and 8 below.

TABLE 7

Average strength (kg)

| Example | 28 | 29 | 30 | 31 | 32 | 33 | 34 | 35 | 36 | 37 |
|---|---|---|---|---|---|---|---|---|---|---|
| | 7.4 | 7.4 | 10 or more | 4.7 | 10 or more | 10 or more | 10 or more | 10 or more | 10 or more | 10 or more |

TABLE 8

Average strength (kg)

| Comparative Example | 5 | 6 | 7 | 8 | 10 |
|---|---|---|---|---|---|
| | 10 or more | 10 or more | 10 or more | 10 or more | 10 or more |

Tables 7 and 8 reveal that the ruminant feed additive compositions of the present invention have a sufficient strength.

Examination Example 6

(Measurement of a porosity of a ruminant feed additive composition)

The porosity of the compositions obtained in Examples 28 to 37 and Comparative Examples 5 to 8 and 10 was measured by the following method. That is, the specific gravity of the compositions and the components thereof was measured. The porosity of the compositions of the present invention was found upon comparing the theoretical volume obtained from the specific gravity of the components and the structural ratio thereof with the found volume of the compositions.

The specific gravity was measured using a "Micromeritex Acubic 1330" supplied by Shimadzu Seisakusho Ltd. That is, the sample was weighed, and charged into a sample cell having a capacity of 10 ml. The cell was purged with helium to measure the sample volume. The specific gravity (g/ml) was obtained from the sample weight (g) and the volume (ml).

The theoretical volume V of 100 g of the composition is represented by the following formula (3) when the volume of 100 g of the composition composed of n-types of the components is v (ml), the specific gravity of each component is Dn (g/ml) and the structural ratio is Pn (%).

$$V = \sum_{1}^{n} (Pn/Dn) \quad (3)$$

Accordingly, the porosity G (%) is calculated by the following formula (4).

$$G = (V/v - 1) \times 100 \quad (4)$$

The results are shown in Tables 9 and 10 below.

TABLE 9

Porosity (%)

| Example | 28 | 29 | 30 | 31 | 32 | 33 | 34 | 35 | 36 | 37 |
|---|---|---|---|---|---|---|---|---|---|---|
| | 19.3 | 18.7 | 19.5 | 19.6 | 16.5 | 15.8 | 17.1 | 18.1 | 17.5 | 17.8 |

TABLE 10

Porosity (%)

| Comparative Example | 5 | 6 | 7 | 8 | 10 |
|---|---|---|---|---|---|
| | 18.2 | 17.9 | 28.7 | 28.7 | 32.3 |

Tables 9 and 10 reveal that the ruminant feed additive compositions of the present invention have a lower porosity than the compositions (Comparative Examples 7, 8 and 10) obtained through the granulation using a large amount of water. Further, Tables 4 and 6 reveal that the compositions having a high porosity exhibit the rumen juice resistance in the rumen but the poor dissolution in the abomasum, and cannot satisfy the two conditions that both the rumen juice resistance and the dissolution in the abomasum are good as aimed at by the present invention.

Examination Example 7

(Test for separation of a ruminant feed additive composition from a formula feed)

With respect to four types of the compositions obtained in Examples 28 and 29 and Comparative Examples 5 and 6, namely, the compositions having the same formulation (or composition) but having different particle diameters of 6 mm, 4.5 mm, 3 mm and 1.5 mm, respectively, the test for classification or separation from a formula feed was conducted. That is, 2,000 g of a formula feed having a particle diameter of approximately 6 mm and being used widely was charged into a vibration screen classifier. 200 g of each of the four types of the compositions obtained in Examples 28 and 29 and Comparative Examples 5 and 6 were charged onto this formula feed. The screen classifier was vibrated for 2 minutes, and the time that lapsed until each composition was dropped in the formula feed through the vibration and completely disappeared from the upper layer, was measured.

The results of the measurement are shown in Table 11 below.

TABLE 11

| Classification condition | | | | |
|---|---|---|---|---|
| | Example 28 | Example 29 | Comparative Example 5 | Comparative Example 6 |
| Particle diameter (mm) | 6 | 4.5 | 3 | 1.5 |
| Results of measurement | Unchanged even after 2 minutes | Unchanged even after 2 minutes | 30 seconds | 10 seconds |

Table 11 reveals that the compositions having the particle diameter of larger than 4 mm allow almost no classification or separation from the formula feed and enable the uniform intake by ruminants.

Examination Example 8

(Difference in flow rate of particles in vivo owing to difference in particle diameter)

(a) Formation of test particles:

L-isoleucine (458 g) pulverized, 166 g of powdery stearic acid, 61 g of palm oil, 6 g of sodium carboxymethyl cellulose, 211 g of talc and 100 g of chromium EDTA complex were mixed with a ribbon mixer for 20 minutes to form a uniform powder mixture.

The same procedure as in Example 28 was conducted to obtain 970 g of a dried product having a particle diameter of 6 mm. A 900 g portion of this product was charged into a coater. The temperature of the mass was maintained at from 52 to 55° C. A mixed slurry composed of 360 g of hardened tallow and 90 g of talc which slurry had been melted while being maintained at 70° C. was added thereto dropwise (50% coating) to obtain 1,275 g of a composition. The specific gravity was 1.30 g/ml. The rumen protection rate was measured by the method described in Examples, and it was found to be 100%.

The same procedure was conducted using a die having a diameter of 1.5 mm, 3 mm or 4.5 mm. In this manner, the compositions were obtained in amounts of 1,250 g, 1,270 g and 1,265 g, respectively. The specific gravities thereof were 1.28 g/ml, 1.31 g/ml and 1.29 g/ml, respectively. The rumen protection rate was all 100%.

Further, the average strength of all of the compositions was 10 kg or more, and the porosity thereof was between 19.5 and 20.0%.

(b) Measurement of the flow rate of particles in a digestive organ using a milch cow:

Two-hundred grams of each of the above-mentioned test sample (particles) having the different particle diameters were orally administered at a single time to a cow fitted with a duodenal canula. The particles were sampled from the duodenal canula every three hours for 72 hours. Each of the samples was divided into the solid moiety and the supernatant through centrifugal treatment. The solid moiety was heat-treated to dissolve the particles. After the removal of proteins, the chromium content was determined, and the chromium content in each fraction was determined. These were plotted for each period of time, and the average residence time of the particles up to the duodendrum was measured. The results are shown in Table 12 below.

TABLE 12

| Average residence time | | | | |
|---|---|---|---|---|
| Particle diameter (mm) | 1.5 | 3.0 | 4.5 | 6.0 |
| Average residence time (hr) | 29.1 | 22.6 | 18.0 | 13.5 |

Table 12 reveals that the larger the particle diameter, the shorter the average residence time and the higher the flow rate.

As shown in Tables 3 to 12, since the ruminant feed additive compositions of the present invention have the particle diameter of approximately 4 mm or more and exhibit the appropriate porosity and the practically sufficient strength, they are excellent in the mixing with a formula feed, the moving rate in vivo is also high, and the rumen juice resistance and the dissolution in the abomasum are high.

(Effects of the Invention)

The present invention provides a ruminant feed additive composition product of which the biochemical and physical properties (the protection in the rumen and the dissolution in the abomasum) of the preparation itself are excellent, and an excellent process for producing a ruminant feed additive composition in which such a product can easily be produced.

What is claimed is:

1. A process for producing a ruminant feed additive composition, which process comprises
    (A) uniformly mixing lysine magnesium phosphate, magnesium oxide, a meltable binder and water; extrusion granulating the uniform mixture at a temperature at which the meltable binder is not deteriorated to form granular particles; or
    (B) uniformly mixing lysine magnesium phosphate, magnesium oxide and a meltable binder; and feeding the uniform mixture to an extrusion granulater having a die for granulation while blowing water before the die to form granular particles; and
    (C) drying the granular particles formed from (A) or (B) under such conditions that the water contained therein is released as water vapor to render porous the structure of the particles, while at the same time the resulting pores are filled with the molten binder which has oozed from the matrix of the granular particles into the resulting pores, and coating the surface of the dry particles with a coating agent.

2. A process for producing a ruminant feed additive composition, which process comprises
    (A) uniformly mixing an amino acid or a salt thereof, an oily binder having a melting point of 40° C. or more and water required for extrusion granulation; and extrusion-granulating this mixture at the molten temperature of the above-mentioned oily binder to form granular particles; or
    (B) uniformly mixing an amino acid or a salt thereof and an oily binder having a melting point of 40° C. or more; feeding the uniform mixture to an extrusion granulater at the molten temperature of the above-mentioned oily binder for granulation while blowing water before the die, to form granular particles: and
    (C) drying the particles resulting from (A) or (B), and coating the surface of the dry particles with an oily coating agent to form particles having a porosity of 20% or less.

3. The process of claim 2, wherein the particle diameter of the particles having the porosity of 20% or less is between 4 and 15 mm.

4. A process for producing a ruminant feed additive composition, which process comprises (A) uniformly mixing an amino acid or a salt thereof, an oily binder having a melting point of 40° C. or more and water required for extrusion granulation; and extrusion-granulating the mixture at the molten temperature of the oily binder to form granular particles; or (B) uniformly mixing an amino acid or a salt thereof and an oily binder having a melting point of 40° C. or more; feeding he uniform mixture to an extrusion granulater having a die at the molten temperature of the oily binder for granulation while blowing water before the die, to form granular particles; and (C) drying the particles resulting from (A) or (B) to form particles having a porosity of 20% or less.

5. The process of claim 4, wherein the particle diameter of the particles having the porosity of 20% or less is between 4 and 15 mm.

6. The process of claims 2 or 4, which further comprises adding at least one filler before or after granulation.

7. The process of claim 6 wherein the filler is selected from the group consisting of magnesium oxide, stearic acid, talc and silica.

* * * * *

UNITED STATES PATENT AND TRADEMARK OFFICE
CERTIFICATE OF CORRECTION

PATENT NO. : 6,238,727 B1
DATED : May 29, 2001
INVENTOR(S) : Tadashi Takemoto et al.

It is certified that error appears in the above-identified patent and that said Letters Patent is hereby corrected as shown below:

Column 30,
Line 30, "extrusion" should read -- extrusion- --;
Line 57, "extrusion granulater" should read -- extrusion granulater having a die --.

Signed and Sealed this

Second Day of April, 2002

Attest:

Attesting Officer

JAMES E. ROGAN
Director of the United States Patent and Trademark Office